(12) United States Patent
Kawahara (10) Patent No.: US 6,558,022 B2
(45) Date of Patent: May 6, 2003

(54) ILLUMINATION DISPLAY SYSTEM AND METHOD FOR CREATING DECORATIVE LIGHT IMAGES

(76) Inventor: Jamie Kawahara, 7181 S. Valley Trails Dr., Pleasanton, CA (US) 94588

( * ) Notice: Subject to any disclaimer, the term of this patent is extended or adjusted under 35 U.S.C. 154(b) by 0 days.

(21) Appl. No.: 09/870,914

(22) Filed: May 30, 2001

(65) Prior Publication Data

US 2002/0181234 A1 Dec. 5, 2002

(51) Int. Cl.$^7$ .............................................. F21U 33/00
(52) U.S. Cl. ...................... 362/257; 362/332; 362/335; 362/809; 362/806; 446/485
(58) Field of Search .................... 362/332, 335, 362/338, 282, 322, 806, 809, 455, 456, 257; 446/219, 485; 353/1; 359/617; 40/427, 441, 433

(56) References Cited

U.S. PATENT DOCUMENTS

| | | |
|---|---|---|
| 2,231,481 A | 2/1941 | Rogers et al. |
| 3,067,352 A | 12/1962 | Vodika et al. |
| 3,686,494 A | 8/1972 | Naylor |
| 3,767,299 A | 10/1973 | Fisher |
| 3,768,886 A * | 10/1973 | Sharpless .................... 350/160 |
| 3,786,886 A | 10/1973 | Sharpless |
| 4,217,141 A | 8/1980 | Longbebeam |
| 4,779,176 A * | 10/1988 | Bornhorst .................... 362/223 |
| 4,832,453 A | 5/1989 | Saad-Cook |
| 4,871,256 A | 10/1989 | Grindon |
| 4,972,305 A * | 11/1990 | Blackburn ................... 362/234 |
| 5,363,009 A | 11/1994 | Monto |
| 5,491,616 A * | 2/1996 | Reed ............................ 362/35 |
| 5,711,598 A | 1/1998 | Tseng |
| 5,749,646 A | 5/1998 | Brotte |
| 5,749,648 A * | 5/1998 | Lin ............................. 362/353 |
| 5,823,661 A | 10/1998 | Mahanay |
| 5,841,585 A | 11/1998 | Katou et al. |
| 5,863,115 A | 1/1999 | Simon |
| 5,879,071 A * | 3/1999 | Sanford, Jr. ................ 362/154 |
| 6,033,092 A | 3/2000 | Simon |
| 6,145,228 A * | 11/2000 | LaChance .................... 40/431 |
| 6,171,170 B1 * | 1/2001 | Lin ............................. 446/404 |
| 6,238,059 B1 * | 5/2001 | Chen ........................... 362/211 |

* cited by examiner

*Primary Examiner*—Sandra O'Shea
*Assistant Examiner*—Anabel Ton
(74) *Attorney, Agent, or Firm*—Gregory Smith & Associates (57) ABSTRACT

The present invention is an illumination system for use near a wall or surface for creating one or more images of light thereon. An important characteristic of the invention is the ability to produce coordinated images by passing radiant light through an at least one convergent refracting lens. The lens may have a decorative shape, and the surface of convergent refracting lens may be embellished with etched, drawn, painted or otherwise applied designs for projecting said images, or a prism for producing decorative rainbow spectra effects. The invention is capable of being used in common household lighting fixtures.

18 Claims, 8 Drawing Sheets

ILLUMINATION DISPLAY SYSTEM AND METHOD FOR CREATING DECORATIVE LIGHT IMAGES

FIELD OF THE INVENTION

The present invention relates to decorative light image generation and projection, and more specifically, to projecting light produced images by passing radiant light through one or more decoratively-shaped light converging lenses whose surfaces may contain prisms for projecting rainbow spectrums or whose surfaces may be etched, drawn, painted or otherwise applied with designs, colors or optical coatings.

DESCRIPTION OF RELATED ART

Many kinds of light image generators are known. Most operate by passing radiating light through a collimator and then through an image-generating plate. Other image generators operate by passing radiating light through a refracting element, which simultaneously collimates and forms the light into an illuminatory image. However, most known image generators are not aesthetically appealing and cannot be used in common household fixtures.

Some decorative light images have been formed by passing light through a revolving color wheel and dispersing the resulting colored light by means of a revolving reflector such as crinkled aluminum foil. The decorative lighting effect consisted primarily of an exciting array of flashes and streaks of colored light. The optical discontinuities are created by the edges, which define the facets in the crinkled reflective surface created hundreds of separate and unrelated splashes of light. However, no consideration was given to providing coordinated whole images on an integrated focal surface.

It is also prior art practice to generate light images by focusing light on a revolving, apertured color disc. The portion of light passing through the moving colored aperture is refracted into a small beam by a projection lens. The beam passes through the peripheral areas of two large convex lenses sequentially positioned in the projection path, the optical properties of the two lenses combine to define a distant focal surface. Each of the convex lenses has smooth optical irregularities randomly formed on each surface generating convolutions in the distant focal surface. The two lenses rotate slowly in opposite directions causing smooth convolutions in the distant focal surface. The lens rotation continuously introduces new combinations of optical irregularities into the projection path, each of which establishes unique and slowing changing convolution arrangements on the focal surface. However, this type of device cannot be used with common household lighting fixtures.

Other known image generators operate by passing radiating light through a refracting element, which simultaneously collimates and forms the light into an illuminatory image. The use of refracting elements to produce decorative light images eliminates the need for light collimators. These prior art image generators used cylindrical refracting elements to produce one-dimensional light spokes. This greatly improves the aesthetic appeal of the image generator, facilitating its use in common household lighting fixtures, but did not produce two-dimensional images. Moreover, the above described devices do not allow for a surface of the refracting element to be embellished with etched, drawn, painted or otherwise applied designs, for projection with said image or have attached a prism for the purpose of producing decorative rainbow spectra effects.

What is needed is a light image generator that avoids the disadvantages of pre-existing light image generators discussed above, that provides coordinated whole images on an integrated focal surface, that eliminates the use of light collimators, that improves aesthetic appeal, that facilitates use in common household lighting fixtures, that allows the use of decoratively shaped refracting lens elements to project light images and that allows for a surface of the refracting element to be embellished with etched, drawn, painted or otherwise applied designs, colors or optical coatings, for projection with said image or have attached a prism for the purpose of producing decorative rainbow spectra effects.

SUMMARY OF THE INVENTION

Accordingly, the present invention is an illumination system for use near a wall or other surface for creating one or more images of light thereon. One important characteristic of the invention is the ability to produce coordinated images by passing radiant light through refracting lenses. An important characteristic of the invention is the ability to use the invention in common household lighting fixtures.

In general, the invention comprises a light source and at least one convergent refracting lens mounted within a support structure adjacent to the light source. The convergent refracting lens preferably comprises a convex lens having an inner and outer surface. The edges of the lenses may be cut, ground, molded or otherwise shaped to follow a decorative pattern or to follow a decorative shape. The refracting lens may be colored, embellished with etching, drawn, painted or otherwise include applied decorations, colors, optical coatings, or may also have attached to its surface one or more prisms. Where there are two or more such lenses, the lenses may be arranged in a decorative array around the light source. In some embodiments the configuration of the array may be a spherical, planar, cylindrical, or irregular in shape and/or distribution. Passing the radiant light through the convergent refracting lens produces images on walls or other surfaces.

In a preferred embodiment the light source is a point light source such as a miniature halogen bulb. However, in alternate embodiments virtually any source of light may be used including but not limited to incandescent bulbs, vacuum bulbs, noble gas bulbs, such as xenon, argon and krypton, sodium bulbs, fluorescent bulbs and metal halide bulbs.

In a preferred embodiment, the convergent refractive lens is fixedly mounted into a support structure. The support structure may be comprised of any suitable commercially available material, such as plastic, glass or metal. For opaque materials, holes complimentary to the outer contour of the lenses are required. Any lens capable of focusing light may be useable. Generally convex shaped lens is preferred. Preferred characteristics of the convex lenses include edges that have been cut ground, molded or otherwise shaped to follow a predetermined decorative outline. The convergent refracting lens is preferably located at a distance from the light source equal to or lesser than the focal length of the convex lenses. Where more than one lens is used, the lenses may be arranged in a decorative array. In some embodiments, the array lenses is rotatable around the light source.

In some embodiments, the array of at least one convergent refracting lens has at least one prism adjacent to the outer surface to produce decorative rainbow spectra on the nearby wall or surface. In other embodiments, the array of at least one convergent refracting lens is at least one colored convex lens resulting in a color image on the nearby wall or surface.

The invention also includes a method for creating one or more decorative images of light on a selected surface generally comprising at least the following steps: (a) providing a light source; (b) providing a support structure; (c) positioning at least one convergent refracting lens mounted on the support structure proximate the light source, with the convergent refracting lens being configured to define a decorative shape; and (d) shining light from the light source through the convergent refracting lens to form a decorative light display on the selected surface.

BRIEF DESCRIPTION OF THE DRAWINGS

A preferred embodiment of the present invention is further described in connection with the accompanying drawings, in which.

DETAILED DESCRIPTION OF THE INVENTION

The following description is provided to enable any person skilled in the art to make and use the invention and sets forth the best mode presently contemplated by the inventor of carrying out her invention. Various modifications, however, will remain readily apparent to those skilled in the art, as generic principles of the present invention have been defined herein.

The present invention is an illumination system or light display device for use near a wall or other surface for creating one or more images of light thereon. The illumination system of the present invention produces coordinated images by passing light through one or more refracting lenses adjacent to a light source. The surface of the refracting lenses may be embellished with etched, drawn, painted or otherwise applied effects. The edges of the lenses are preferably cut, ground, molded or otherwise shaped to follow a decorative pattern or to follow a decorative shape. The a plurality of such lenses may be used and formed into an array around one or more light sources, and configuration of the array of lenses adjacent to the light source may be spherical, planar, cylindrical or irregular in shape and/or distribution. An important characteristic of the invention is the ability to use the invention in common household lighting fixtures.

In the preferred embodiment, one or more convergent refracting lenses 18 are fixedly mounted into a support structure 20. The support structure 20 may be comprised of any suitable commercially available material, including plastic, glass or metal. For opaque materials, holes complimentary to the outer contour of each lens are required. The convergent refracting lenses 18 may be mounted in the support structure 20 using a variety of well-known methods for mounting lenses. For example, when using support structures that are optically clear and identical in shape to the inner surface of individual lenses, the lenses may be directly adhered to the support structure 20 with any acceptable clear adhesive. An alternate method particularly useful for mounting the lenses in the support structure 20 is to form a hole in the support structure complimentary to the outer contour of a lens, insert the lens into the hole and then secure the lens in place with adhesive or other known means for holding the lens. An alternate method of mounting plastic lenses to a plastic support structure is to form the lens and support structure in a single mold, thus resulting in an integral unit. An alternate method of mounting glass lenses into a glass support structure is to press the lenses into a mold filled with molten glass. However, this method may require the polishing of the lenses to remove any flaws created by the pressing process.

Figure 1:
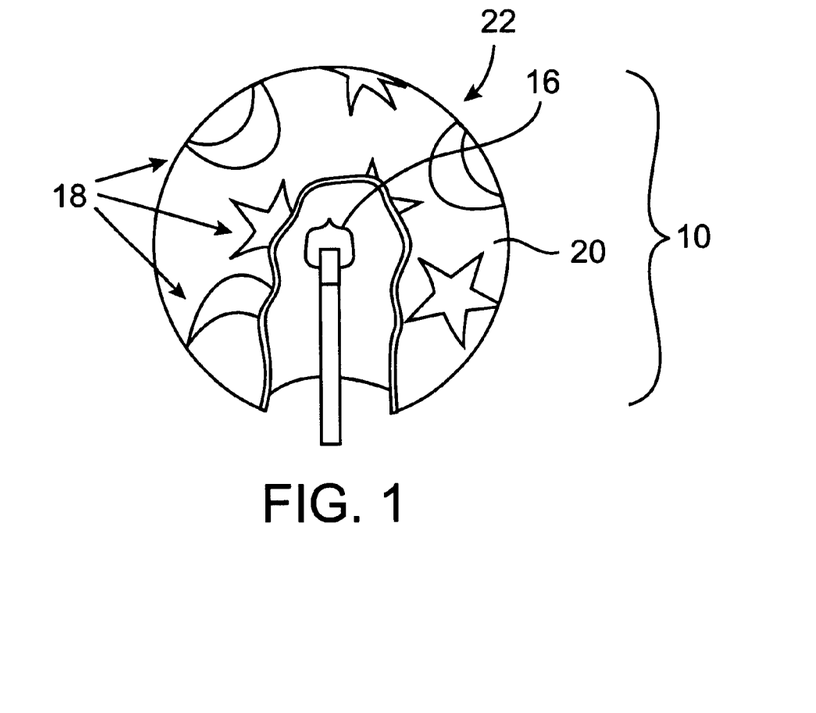
FIG. 1 shows a partial sectional view of a preferred embodiment of the invention with a spherical array of decoratively shaped convex lenses.
Figure 1A:
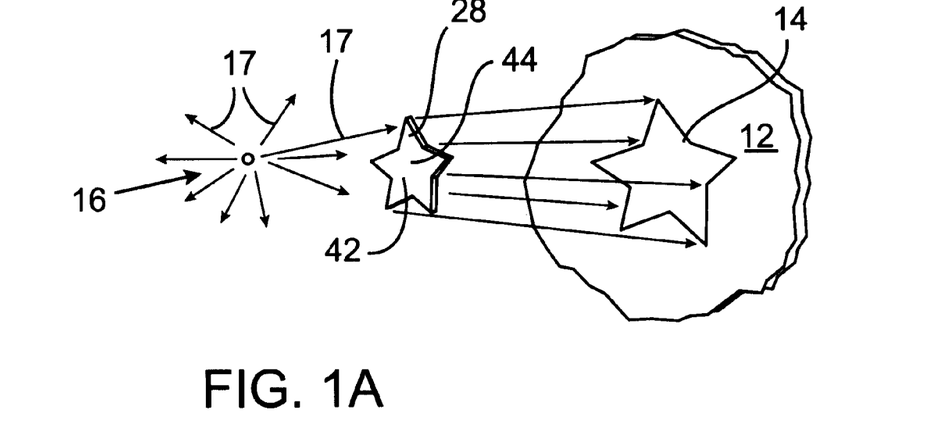
FIG. 1A shows a schematic view of the production of decorative light images of the preferred embodiment of FIG. 1.

Reference will now be made in detail to a presently preferred embodiment of the invention as illustrated in the accompanying drawings. Referring to FIGS. 1 and 1A, the drawings show a preferred embodiment of an illumination system 10 for use near a wall or other surface 12 for creating one or more light images 14 thereon. The illumination system 10 comprises a light source 16 and at least one convergent refracting lens 18 mounted in a support structure 20 adjacent to the light source 16. The light source 16 is preferable capable of producing radiant light 17 through the convergent refracting lens 18. The light source 16 is preferably a miniature halogen bulb. However, alternate types of light sources may be used, such as incandescent bulbs, vacuum bulbs, noble gas bulbs, such as xenon, argon and krypton, sodium bulbs, fluorescent bulbs, metal halide bulbs, gas flames, and candles.

The convergent refracting lens 18 is used to focus light from the light source 16 so that the images created on the nearby walls or surfaces 12 are more clearly defined than those created in some prior art light image display systems.

Figure 2:
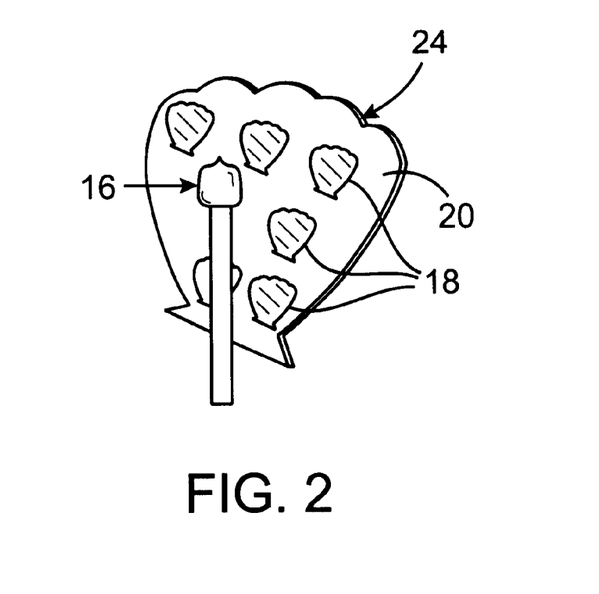
FIG. 2 shows a perspective view of another preferred embodiment of the invention with a planar array of decoratively shaped convex lenses in front of a light source.
Figure 2A:
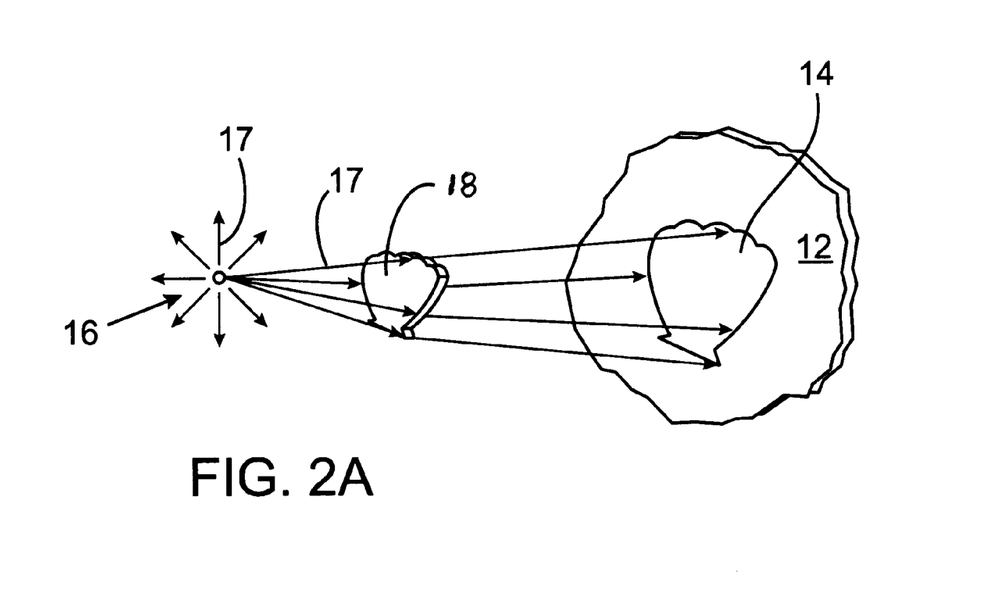
FIG. 2A shows a schematic view of the production of the decorative light images of the preferred embodiment of FIG. 2.
Figure 3:
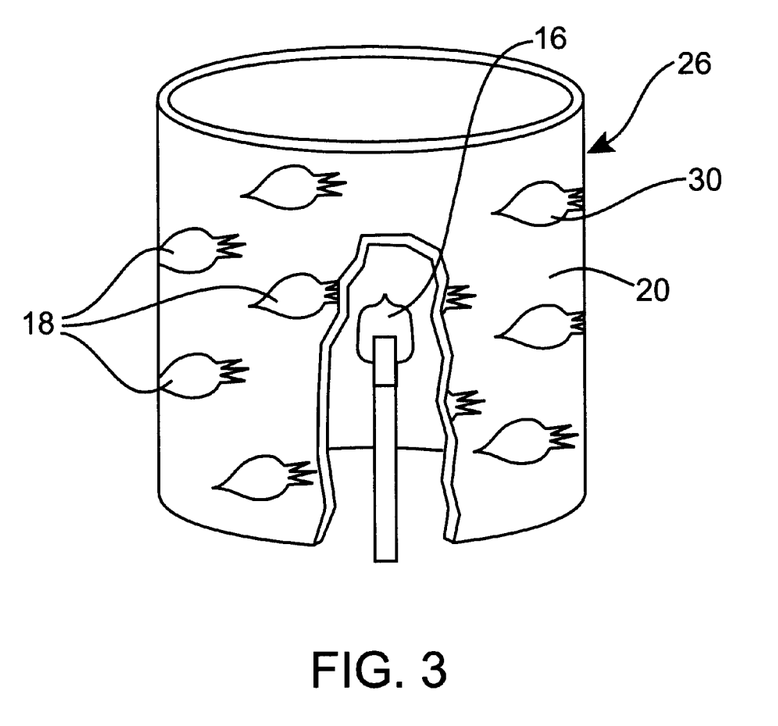
FIG. 3 shows a partial sectional view of another preferred embodiment of the invention with a cylindrical array of decoratively shaped convex lenses.

In some preferred embodiments more than one convergent refracting lens 18 is used. In such preferred embodiment the convergent refracting lenses are preferably arranged in a decorative array near the light source 16. In the embodiment seen in FIG. 1, the array surrounds the light source 16 in a substantially spherical distribution 22. However, any desired geometric shape of the distribution of lenses may be used. FIG. 2 shows another preferred embodiment of the invention with a roughly planar array 24 of decoratively scallop shaped convex lenses 18. FIG. 2A shows a schematic view of the production of the decorative light images of the preferred embodiment of FIG. 2. Some of the light emanating form the light source 16 passes through lens 18, and is focused to form a coherent light image 14 on the surface 12. FIG. 3 shows in section another preferred embodiment of the invention with a cylindrical array 26 of decoratively shaped convex lenses.

Figure 4:
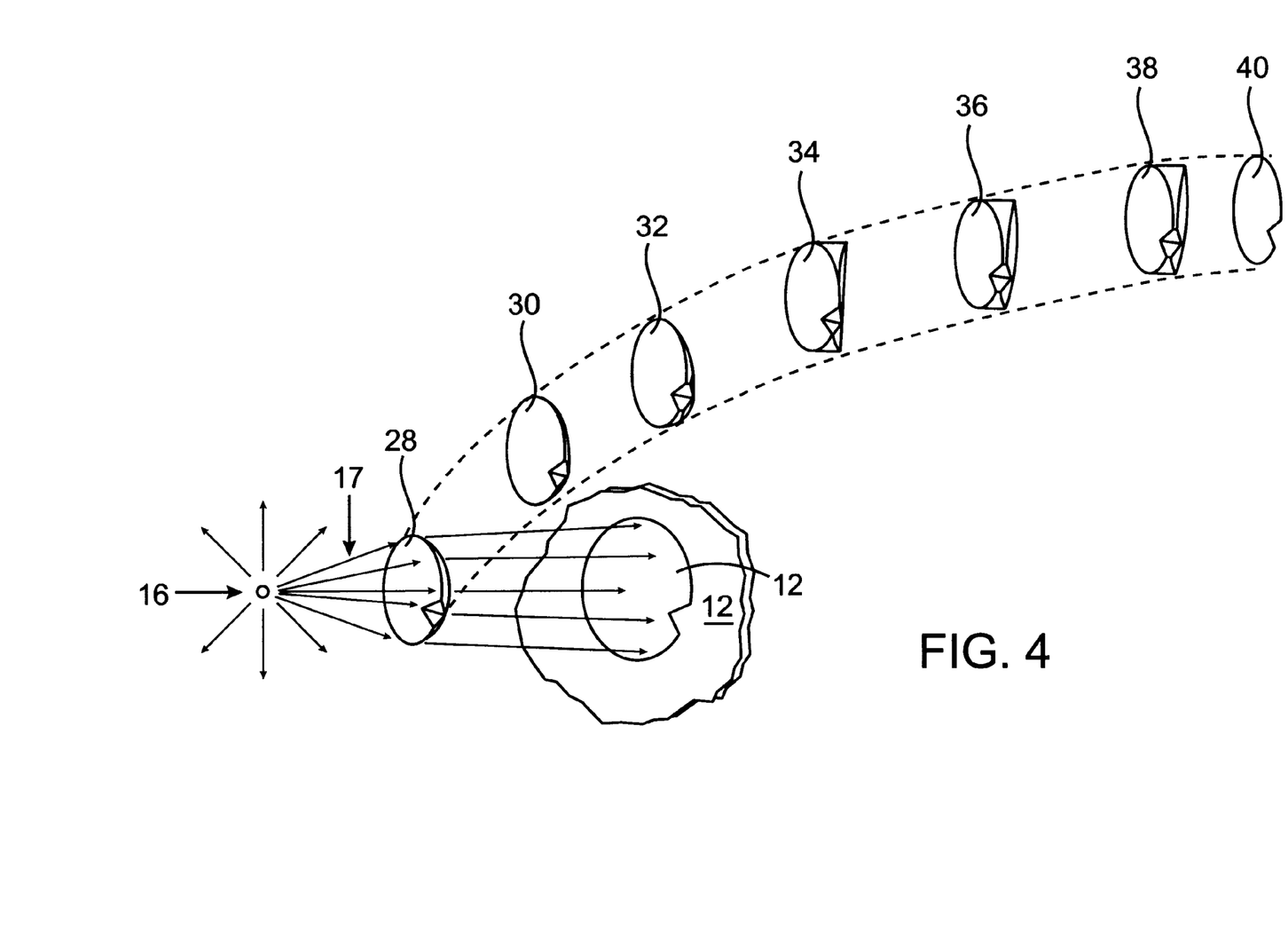
FIG. 4 shows an schematic view of a preferred embodiment of the invention with a bi-convex spherical lens, alternative embodiments for the lens are shown and numbered separately in this Figure.

Referring to FIG. 4, in a preferred embodiment the convergent refracting lens 18 is a meniscus-convex spherical lens 28. Although meniscus-convex spherical lenses 28 were used in prototype construction, any practical type of light-focusing lens may be used in the illumination system 10, including but not limited to bi-convex spherical 30, planar-convex spherical 32, bi-convex cylindrical 34, planar-convex cylindrical 36, meniscus-convex cylindrical 38 and fresnel lenses 40.

The edges of the lenses 28 are preferably cut into decorative shapes as seen in many of the Figures in this patent. Any known method may be used to shape lens 28 including but not limited to such as grinding and molding. However, it is currently preferable that the edges lenses are shaped using a diamond saw.

Referring again to FIG. 4, the distance between the light source 16 and the convergent refracting lens 28 is preferably shorter than the focal length of the lens 28. More preferably, the distance between the light source 16 and the convergent refracting lens 18 is preferably selected to result in an image 14 larger than the lens 28. However, it may be desirable in other embodiments to change the image 14 size. One skilled in the art can easily accomplish this by modifying the lens focal length, the distance from the light source 16 and the distance from the display surface 12.

Figure 5:
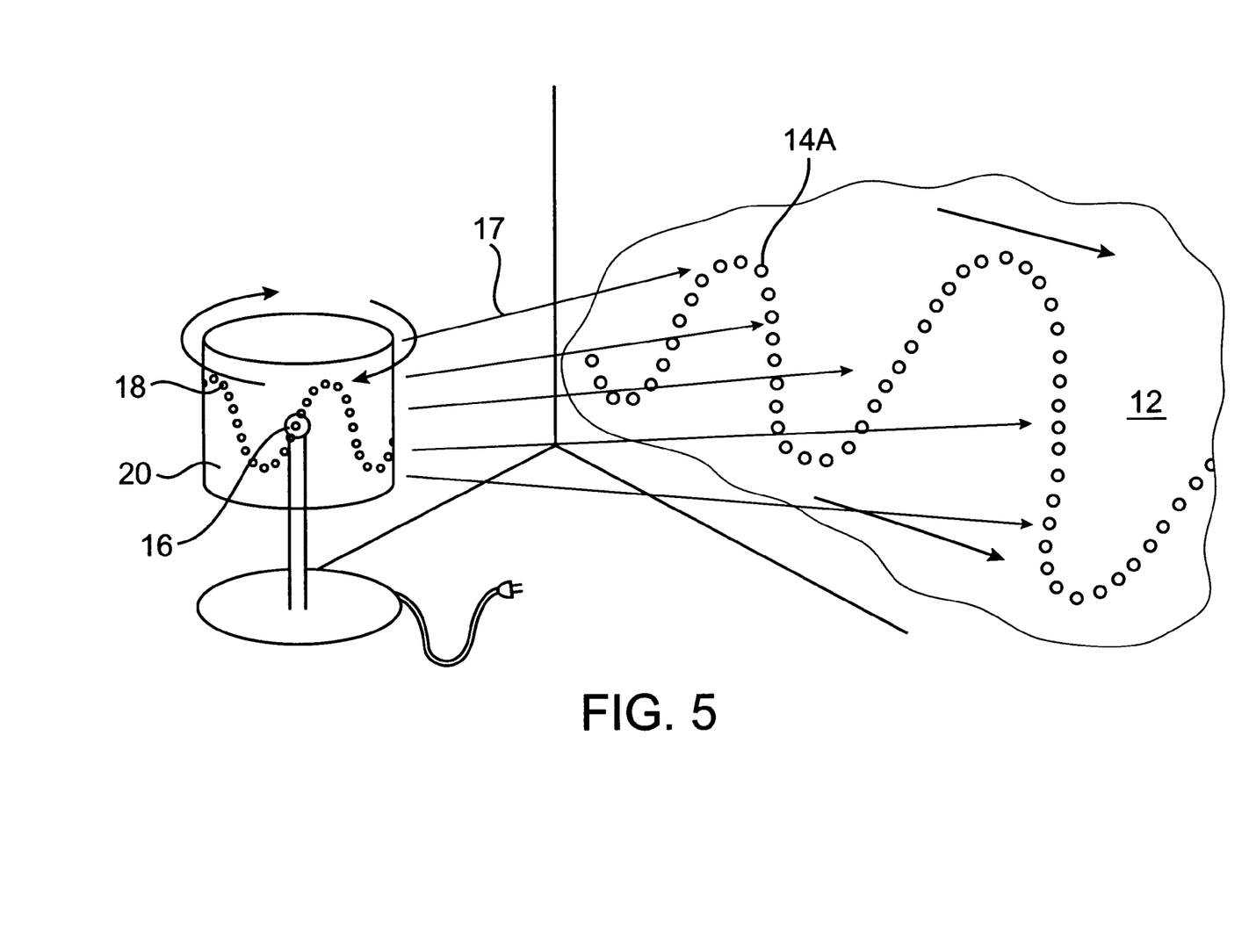
FIG. 5 shows a perspective view of a preferred embodiment of the present invention in which a cylindrical arrangement or array of lenses creates a decorative pattern. In this embodiment, the array may be rotated.

FIG. 5 shows a preferred embodiment wherein the support structure 20 holding the lenses 18 rotates around the light source 16. The refracted light images 14 displayed by this preferred embodiment create a moving display 14A on the nearby wall or surface 12. A drive motor or any similar commercially available device for accomplish such rotation of the support structure 20 may be used.

Figure 6:
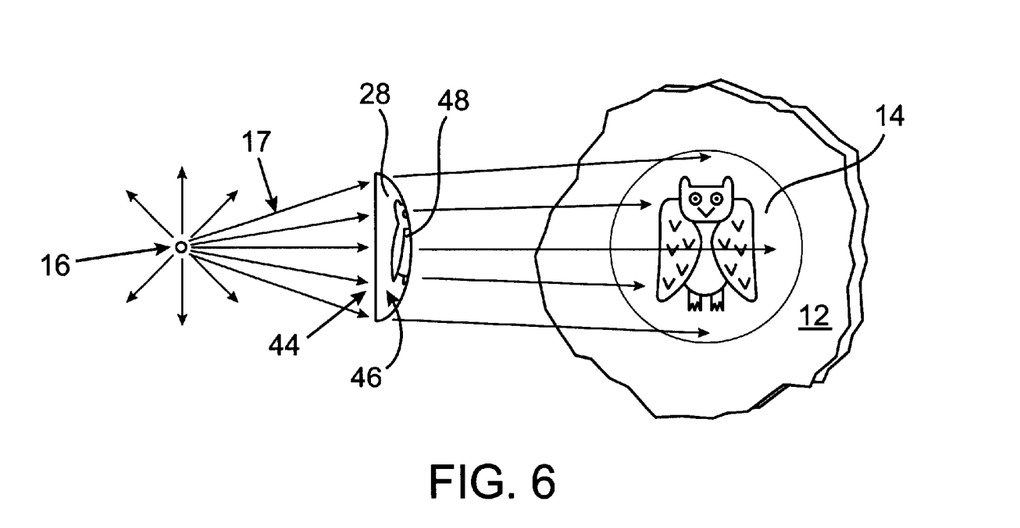
FIG. 6 shows a schematic view of the decorative light image pattern generated by a light source and a convex spherical lens with a design applied to the outer surface of the lens.

Referring to FIG. 6, the invention also comprehends embodiments wherein a design has been applied to the a surface of the convergent refracting lens. More specifically, the design 48 may be applied to either the inner surface 44 or outer surface 46 of the meniscus-convex spherical lens 28. In prototype construction design 48 was directly drawn on the outer surface 46 of the meniscus-convex lens 28 with a permanent ink marker. However, any alternative method of application may be used, including but not limited to painting, airbrushing or drawing with a suitable transparent medium, or the application of a permanent or removable film attached to the lens. The designs may be temporary of permanent in nature, and the designs maybe created during the manufacture of the illuminated display system or added by the consumer later. Any desired variety of designs may be used. The designs 48 are preferably created by a variety of predetermined forms, such as a painted design pre-applied by the producer, a temporary design applied by the consumer, a permanent or removable film attached to the lens.

Figure 7:
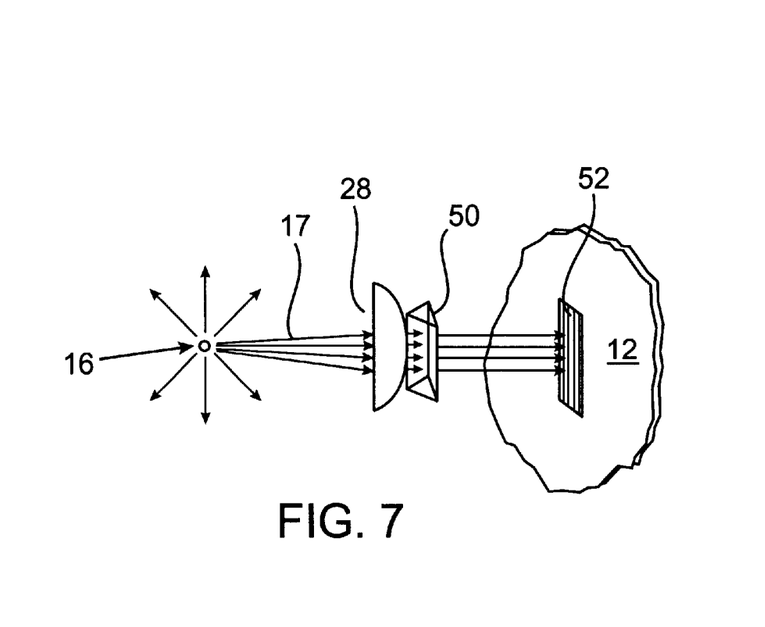
FIG. 7 shows a schematic view of a rainbow spectra pattern generated by a light source and a convex spherical lens with a prism attached to the outer surface of the lens.

In another preferred embodiment, seen in FIG. 7, a prism 50 is placed on or near the surface of the convergent refracting lens 18. Light rays passing through the meniscus-convex spherical lens 28 and the prism 50 are chromatically dispersed resulting in a decorative rainbow spectrum image 52.

Figure 8:
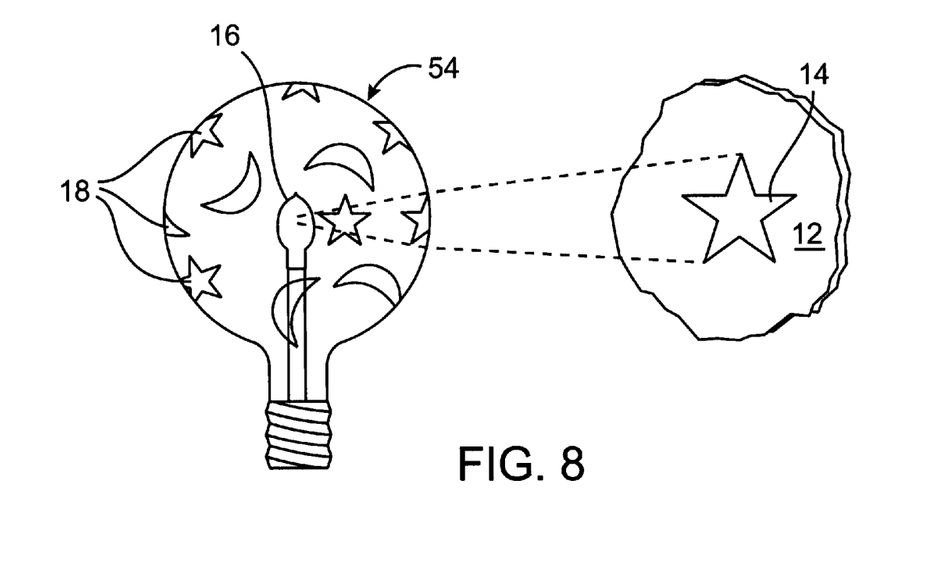
FIG. 8 shows a perspective view of a preferred embodiment of the invention arranged to resemble a common household light bulb.

In another preferred embodiment of the illumination display system, seen in FIG. 8, the convergent refracting lenses 18 and the light source 16 are arranged in a fashion as to resemble a common household light bulb 54. In the preferred embodiment, the lenses 18 have been applied directly to the support structure 20, which is configured in the shape of a typical incandescent light bulb. Any known and acceptable means for affixing he lenses 18 to the support structure 20 may be used.

Figure 9:
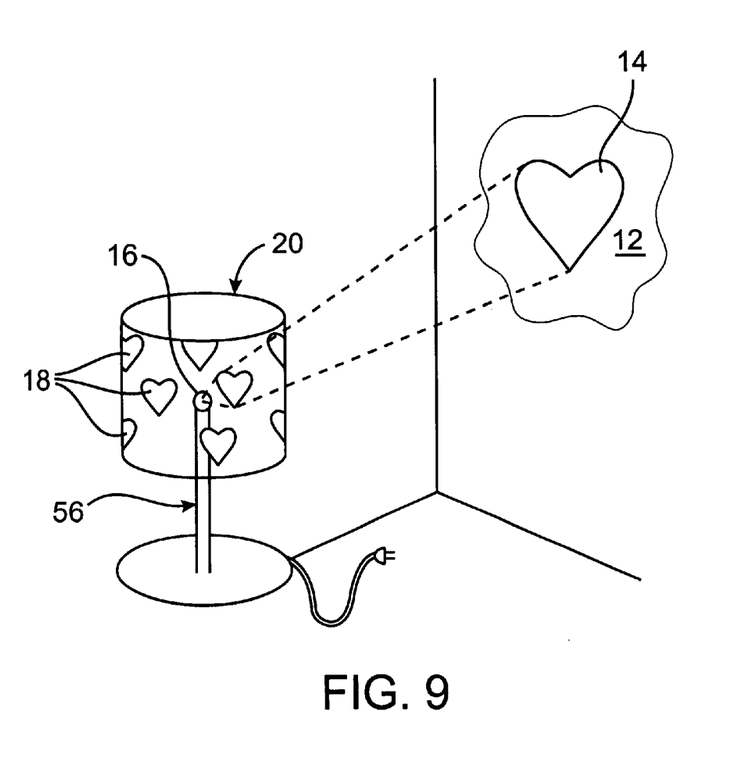
FIG. 9 shows a perspective view of another preferred embodiment of the invention arranged to resemble a common household lamp.

In another preferred embodiment, seen in FIG. 9, the convergent refracting lenses 18 are held in the support structure 20 which in this shaped as a typical lamp shade.

Figure 10:
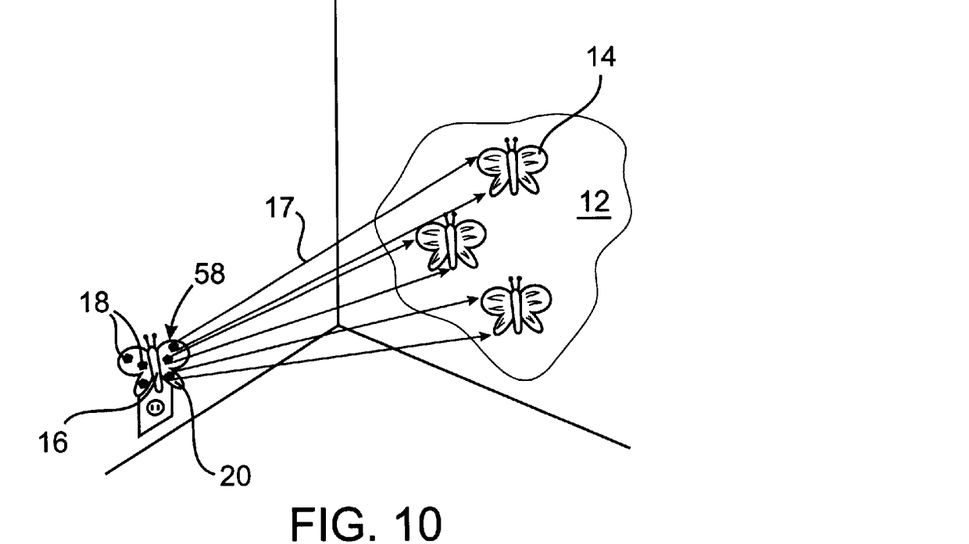
FIG. 10 shows a perspective view of another preferred embodiment of the invention arranged to resemble a common household night-light.

In another preferred embodiment, seen in FIG. 10, the convergent refracting lenses 18 and support structure 20 are configured to resemble a common household night-light 58.

Figure 11:
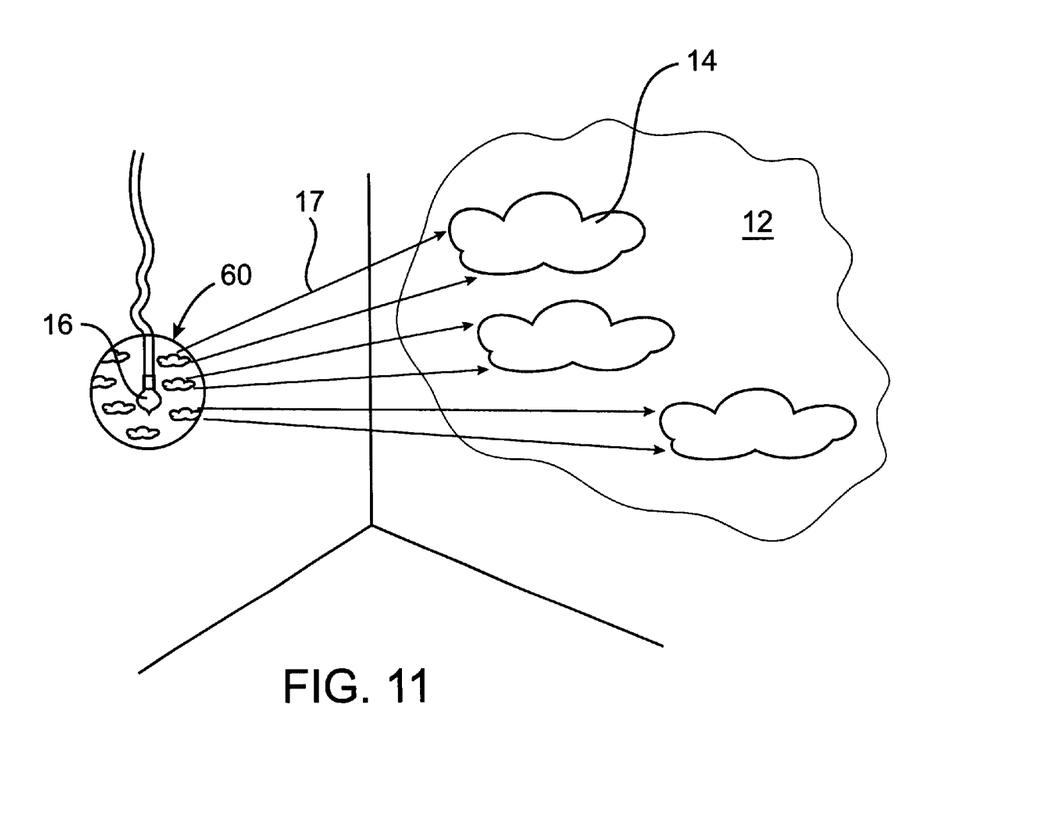
FIG. 11 shows a perspective view of another preferred embodiment of the invention arranged to resemble a hanging lighting fixture.

In another preferred embodiment, as best seen in FIG. 11, the convergent refracting lenses 18 and light source 16 are configured to resemble a typical hanging light 60 that can be mounted to an architectural surface, such as a ceiling, wall or column.

The preferred embodiments described herein are illustrative only, and although the examples given include many specifics, they are intended as illustrative of only a few possible embodiments of the invention. Other embodiments and modifications will, no doubt, occur to those skilled in the art. The examples given should only be interpreted as illustrations of some of the preferred embodiments of the invention, and the full scope of the invention should be determined by the appended claims and their legal equivalents.

What is claimed is:

1. An illumination display system for creating one or more decorative images of light on a surface, the illumination display system comprising:
   a light source capable of emitting radiant light,
   at least one convergent refracting lens having an inner surface, an outer surface, and an outer edge, said at least one convergent refracting lens being held by a support structure proximate said light source, said outer edge of said at least one convergent refracting lens defines a non-circular decorative shape, and
   whereby a shape of said decorative image is at least partly defined by said decorative shape of said lens.

2. The illumination display system of claim 1, wherein said at least one convergent refracting lens comprises at least two convergent refractive lenses.

3. The illumination display system of claim 2, wherein said at least two convergent refractive lenses comprise a decorative array.

4. The illumination display system of claim 1, wherein said at least one convergent refracting lens comprises a lens selected from the group consisting of bi-convex, planar-convex, meniscus-convex, and fresnel.

5. The illumination display system of claim 1, wherein said at least one convex lens has a focal length, and wherein said at least one convex lens is positioned a distance from said light source equal to or less than said focal length.

6. The illumination display system of claim 1, wherein said at least one convergent refracting lens has at least one decorative design applied to said inner surface.

7. The illumination display system of claim 1, wherein said at least one convergent refracting lens has at least one decorative design applied to said outer surface.

8. The illumination display system of claim 1, wherein said at least one convergent refracting lens includes at least one prism adjacent to said outer surface of said at least one convergent refracting lens.

9. The illumination display system of claim 3, wherein said decorative array is capable of rotating around said light source.

10. A method for creating one or more decorative images of light on a selected surface, the method comprising the steps of:
    (a) providing a light source;
    (b) providing a support structure;
    (c) positioning at least one convergent refracting lens mounted on said support structure proximate said light source, said at least one convergent refracting lens having an inner surface, an outer surface, and an outer edge, said outer edge of said at least one convergent refracting lens defining a decorative shape; and
    (d) shining light from said light source through said at least one convergent refracting lens to form a decorative light display on the selected surface.

11. The method of claim 10, further comprising the step of shaping said at least one convergent refracting lens to define a predetermined decorative shape by removing portions of said of at least one convergent refracting lens.

12. The method of claim 10, wherein said at least one convergent refracting lens comprises of comprises at least two convergent refractive lenses.

13. The method of claim 12, wherein said at least two convergent refractive lenses comprise a decorative array.

14. The method of claim 10, wherein said at least one convex lens has a focal length, and wherein said at least one convex lens is positioned a distance from said light source equal to or less than said focal length.

15. The method of claim 10, further comprising the step of applying a decorative design to said inner surface of said at least one convergent refracting lens.

16. The method of claim 10, further comprising the step of applying a decorative design to said outer surface of said at least one convergent refracting lens.

17. The method of claim 10, further comprising the step of positioning a prism at adjacent to said outer surface of said at least one convergent refracting lens.

18. The method of claim 13, further comprising the step of rotating said decorative array around said light source.

* * * * *